United States Patent
Casiano

[11] 3,824,914
[45] July 23, 1974

[54] EXPRESSO COFFEE MACHINE

[76] Inventor: Sergio M. Casiano, 416 S.W. 8th St., Miami, Fla. 33130

[22] Filed: May 16, 1973

[21] Appl. No.: 360,797

[52] U.S. Cl. .............................................. 99/302 R
[51] Int. Cl. .............................................. A47j 31/34
[58] Field of Search ......... 99/300, 302 R, 280, 291, 99/295, 281, 282

[56] References Cited
UNITED STATES PATENTS

| | | | |
|---|---|---|---|
| 2,464,862 | 3/1949 | Herrera | 99/300 |
| 2,688,911 | 9/1954 | Hochmayr | 99/302 |
| 2,881,692 | 4/1959 | Volcov | 99/302 R |
| 2,898,843 | 8/1959 | Rockriver | 99/302 R |
| 3,098,424 | 7/1963 | Perucca | 99/302 |
| 3,278,087 | 10/1966 | Stasse | 99/302 |

*Primary Examiner*—Robert W. Jenkins

[57] ABSTRACT

An expresso coffee machine which utilizes a water proportioning device referred to as a "Doser" which is electrically actuated to consistently, automatically measure the exact amount of water required for each coffee brewing demand. The water doser operates in conjunction with a high pressure water pump for forced percolation. A selector switch is provided on the front of the coffee maker which enables the operator to select the exact desired volumn of water.

7 Claims, 4 Drawing Figures

EXPRESSO COFFEE MACHINE

STATE OF THE PRIOR ART

Most expresso coffee makers now in use employ electric timers, compressed air or manually controlled hand levers. Such devices are subject to inconsistancies due to incorrectly adjusted timing mechanisms or human error, in the case of hand levers, resulting in losses in the ground coffee product. The coffee makers now in use employing timing mechanisms are completely inflexible and the manually operated models demand constant attention on the part of the operators.

BACKGROUND OF THE PRESENT INVENTION

The present invention pertains to an expresso coffee maker which employs a water proportioning device called a "Doser," which is electrically actuated to consistently, automatically measure the exact desired amount of water required for each coffee demand.

The doser is in the form of a vertical cylinder which receives the water from a source of supply such as from the city water system. A plurality of variable length electrodes extend downwardly into the cylinder, the shortest electrode determines the maximum amount of water in the cylinder, the longest or ground electrode determines the minimum amount of water therein and the intermediate electrodes measure independent water doses as determined by a selector switch. In the form illustrated in the accompanying drawings, three intermediate electrodes are provided and a three position selector switch is employed to selectively complete electric cirucits through the three intermediate electrodes. In this manner selected, variable, precise amounts of water can be delivered to the coffee brewing cup in the front of the machine.

All of the electrodes are manually, slidably adjustable to vary the amount of their penetration into the cylinder, resulting in three precise desired deliverable doses of water to the coffee brewing receptacles.

DETAILED DESCRIPTION OF THE DRAWINGS

Figure 1:
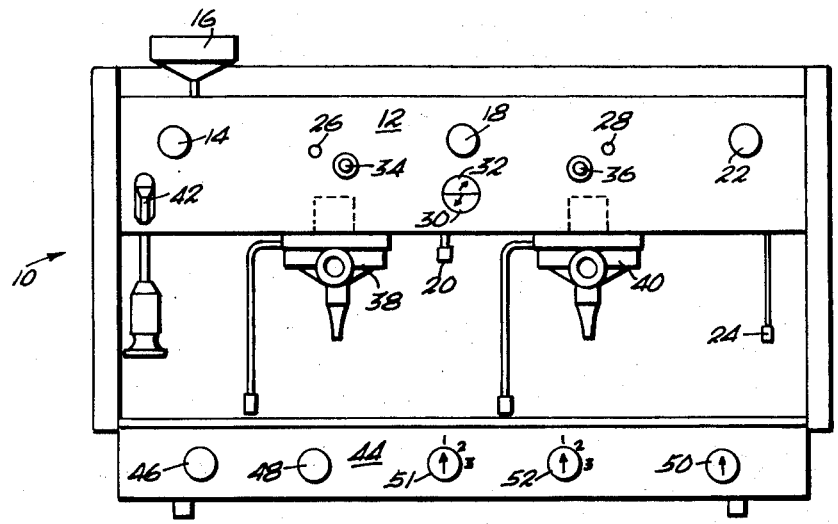
FIG. 1 is a front elevational view of a typical expresso coffee making machine in accordance with the present invention.

With reference to the drawings in which like reference characters designate like or corresponding parts throughout the various views and with particular reference to FIG. 1, the expresso coffee making machine of the present invention is designated generally at 10. The machine illustrated at 10 represents one form of the invention and the various controls and locations thereof may vary without departing from the true spirit of the invention. It should also be noted that the machine as illustrated includes two dosers to provide a double output. In fact, the machine may be constructed to provide one, two, three or more dosers with a like number of outputs.

As illustrated in FIG. 1, the expresso coffee making machine of the present invention includes an upper control panel 12 which may include a control knob 14 for a warmer valve which supplies hot water to a warmer 16. Control knob 18 actuates a valve to supply hot water to a discharge nozzle 20 and knob 22 actuates a valve to supply steam to a discharge nozzle 24.

The pilot lights 26 and 28 indicate a ready condition of the hot water in the respective output systems and temperature and pressure gauges 30 and 32 may be included in the upper control panel 12. A pair of push button switches 34 and 36 actuate the respective output systems to supply hot water to the coffee brewing receptacles 38 and 40. A water level indicator 42 for the boiler may also be included.

A lower control panel 44, as illustrated, is provided with a valve control knob 46 to drain the warmer 16, a manual control knob 48 to a valve to control the water supply to the boiler and a main on-off switch 50 for the entire electrical system. As further illustrated in FIG. 1, a pair of 3 position dose selector switches 51 and 52 are provided for the respective output systems.

Figure 2:
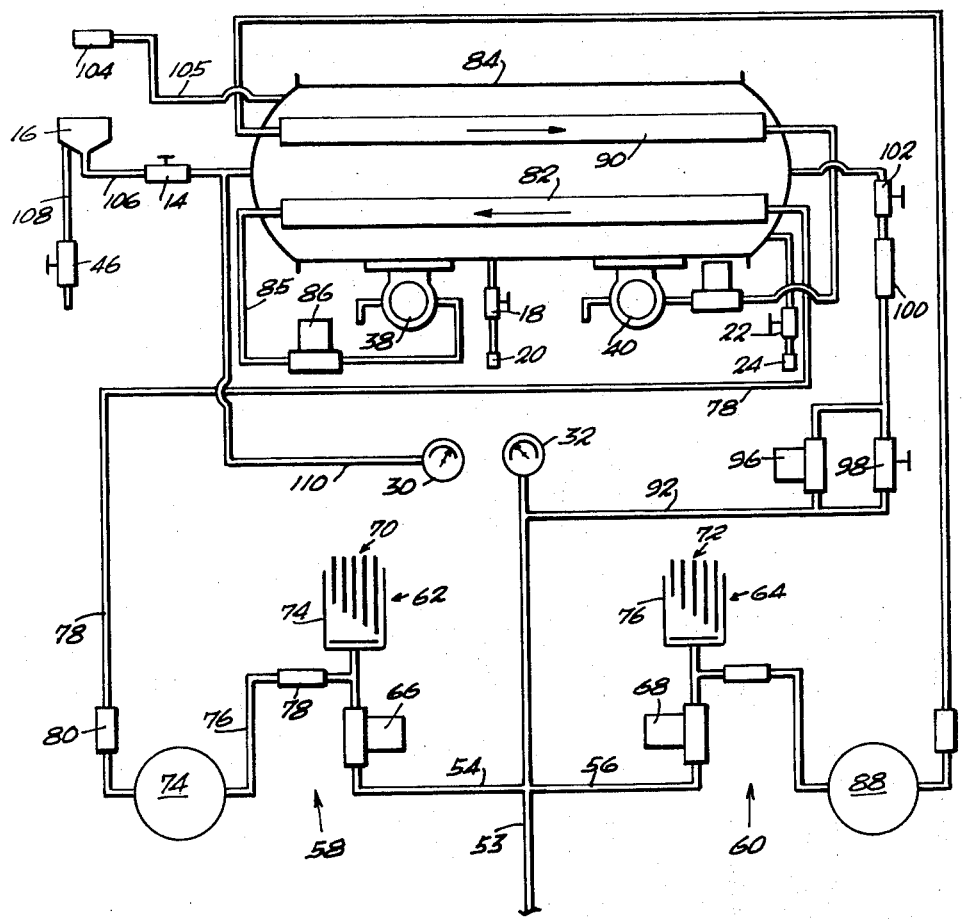
FIG. 2 is a hydraulic schematic of the coffee making machine.

Referring now to the hydraulic system of FIG. 2, cold water at city pressure is fed into the system through a conduit 53. The water is diverted separately through conduits 54 and 56 to the respective systems 58 and 60 when a dual output system is employed. In the case of a single output system, the water would be diverted to a single conduit to said single system while in a triple output system, the water would be diverted separately through three conduits to the respective systems.

The water is fed to respective dosers 62 and 64, in the dual system illustrated, by means of the one way solenoid valves 66 and 68, to a depth which is electrically measured by the respective pluralities of variable length electrodes, indicated generally at 70 and 72, as will be more fully apparent from the subsequent description of the electrical diagram. In practice, each doser 62 and 64 is in the form of a clear plastic, vertical cylinder 74 and 76. The water enters the dosers 62 and 64 where it is electrically measured by the electrodes 70 and 72, assuming both systems are actuated, and the water supply is then automatically cut off by actuation of the solenoids 66 and 68. Obviously, if only one system is actuated, this function occurs only in that one system. The water in the dosers is no longer at city pressure.

Assuming that the three position doser switch 51 is set to one of the three positions and the push button switch 34 is actuated to energize a pump 74, the water in the doser 70 is drawn through a conduit 76, containing a check valve 78, through pump 74 and discharged under high pressure through a conduit 78, containing a strainer 80. From conduit 78, the desired charge of water is delivered into an immersion tube 82 in a boiler 84. The boiler 84 is filled with hot water and steam which indirectly heats the water in the immersion tube 82. When the charge of water enters one end of the immersion tube 82, a like charge of hot water is displaced from the other end through a conduit 85 to the coffee brewing receptacle 38. During the time that the pump 74 is operating, the charge of water being delivered therefrom is under high pressure, resulting in a high pressure charge of hot water from the immersion tube 82 to the receptacle 38, containing a proper amount of ground coffee, where it is force percolated through strainers into appropriate receiving cups.

A two-way solenoid valve 86, adjacent the brewing receptacle 38, relieves the system of all high pressure after the infusion has occurred and sets the machine in a normal condition, ready for another infusion.

The period of time that the pump 74 operates is controlled directly by the three position switch which completes a circuit through one of the electrodes 70 to positively, consistantly deliver the precise, desired charge of water to the brewing receptacle 38.

When the push button switch 36 is actuated, a pump 88 delivers a selected charge of water as determined by the 3 position switch 52, to an immersion tube 90. In turn, a charge of hot water is delivered therefrom to the brewing receptacle 40. All of the functions of this second system are like those just described relative to the first system and need no further explanation.

The boiler 84, as previously described as filled with hot water and steam during use. The water is brought up to the proper temperature and so maintained by an immersion heater which will be described relative to FIGS. 3 and 4. The water is fed into the boiler by a conduit 92 from the water supply conduit 53 which also includes the water pressure gauge 32. A solenoid valve 96 is actuated when the main "on-off" switch 50 is moved to the "on" position. As illustrated in FIG. 2, a manually operated by-pass valve 98 may be included in the system for operation in the event of solenoid failure. Also included in the conduit 92 are a strainer 100 and shut-off valve 102. A temperature control thermostat 104 for the boiler water is controlled through a conduit 105 opening into said boiler.

Water is fed to the warmer 16 directly from the hot water contained in the boiler 84 by a conduit 106 containing the manually operated valve 14. Water in the warmer may be drained through a conduit 108 by means of the manually operated valve 46.

The single outlet spout 20 from the boiler 84 is provided with each machine and the manually controlled valve 18 is actuated to provide hot water for the making of tea or for the heating of hot water. Also included is the steam outlet spout 24 and its manually controlled valve 22. A conduit 110 supplies hot water from the boiler 84 to the temperature gauge 30.

Figure 3:
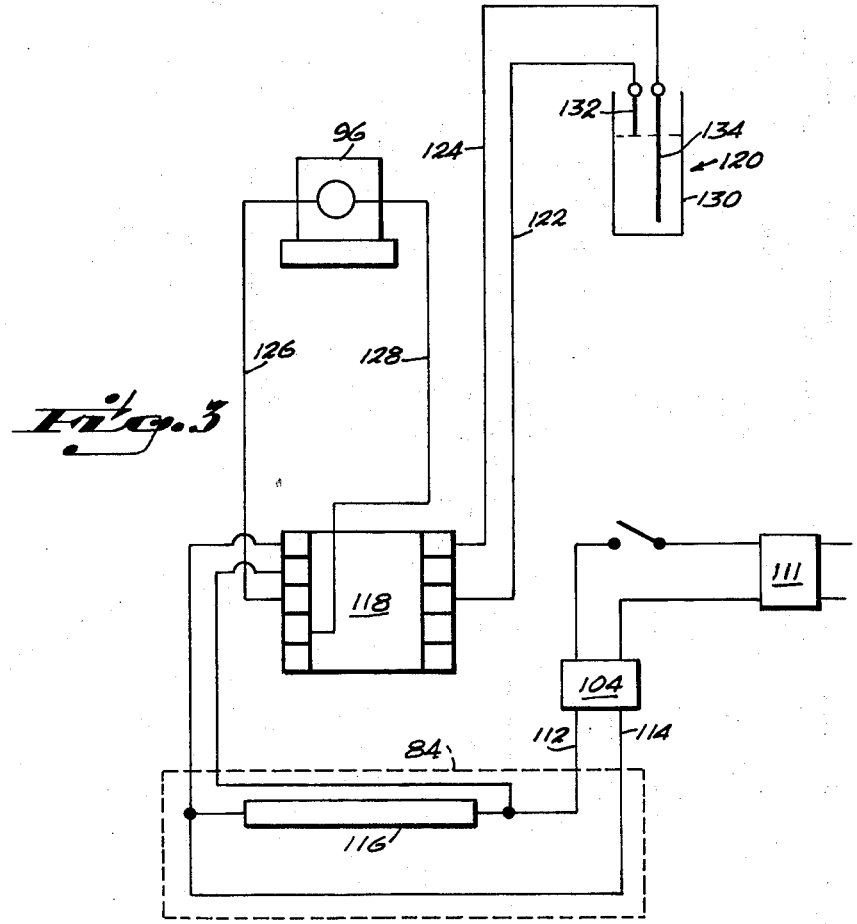
FIG. 3 is an electrical schematic of the boiler filler and heater of the coffee making machine.

With reference to FIG. 3, the electrical schematic of the boiler filler and heater portion of the electric circuitry illustrates a plug 111 for insertion in a conventional 120 v. electric outlet. The leads 112 and 114 from the plug lead respectively to the immersion heater 116 in the boiler 84 and an electronic control center regulator 118. In the event of steam or water loss from the boiler 84 due to leakage or use with the water warmer device 16, a water operated switch 120, connected to the control center 118 by leads 122 and 124, senses this loss and automatically actuates the solenoid 96, FIGS. 2 and 3 through leads 126 and 128, admitting water into the boiler 84 until the desired water level has been re-established.

At start-up time, when the on-off switch 50 is turned on, a thermostate in the form of the bi-metal mercury switch 104 energizes the immersion heater 116, the water switch 120 through leads 122 and 124 and through the regulator 118 to make sure sufficient water is in the boiler 84. This bi-metal mercury switch 104 cuts off the electricity when the boiler 84 comes up to the required temperature.

In practice the water switch, indicated generally at 120 consists of a column 130 which communicates with the boiler 84 and provides the visual gauge 42 to observe the water level. Into this column 130 is positioned short and long electrodes 132 and 134, connected respectively with the leads 122 and 124. When the water level falls below the short electrode 132, the solenoid 96 is activated to provide water to the boiler 84 until the set water level has been re-established. The short electrode 132 is slidably adjustable in the column 130 to permit manual control of the boiler water level.

Figure 4:
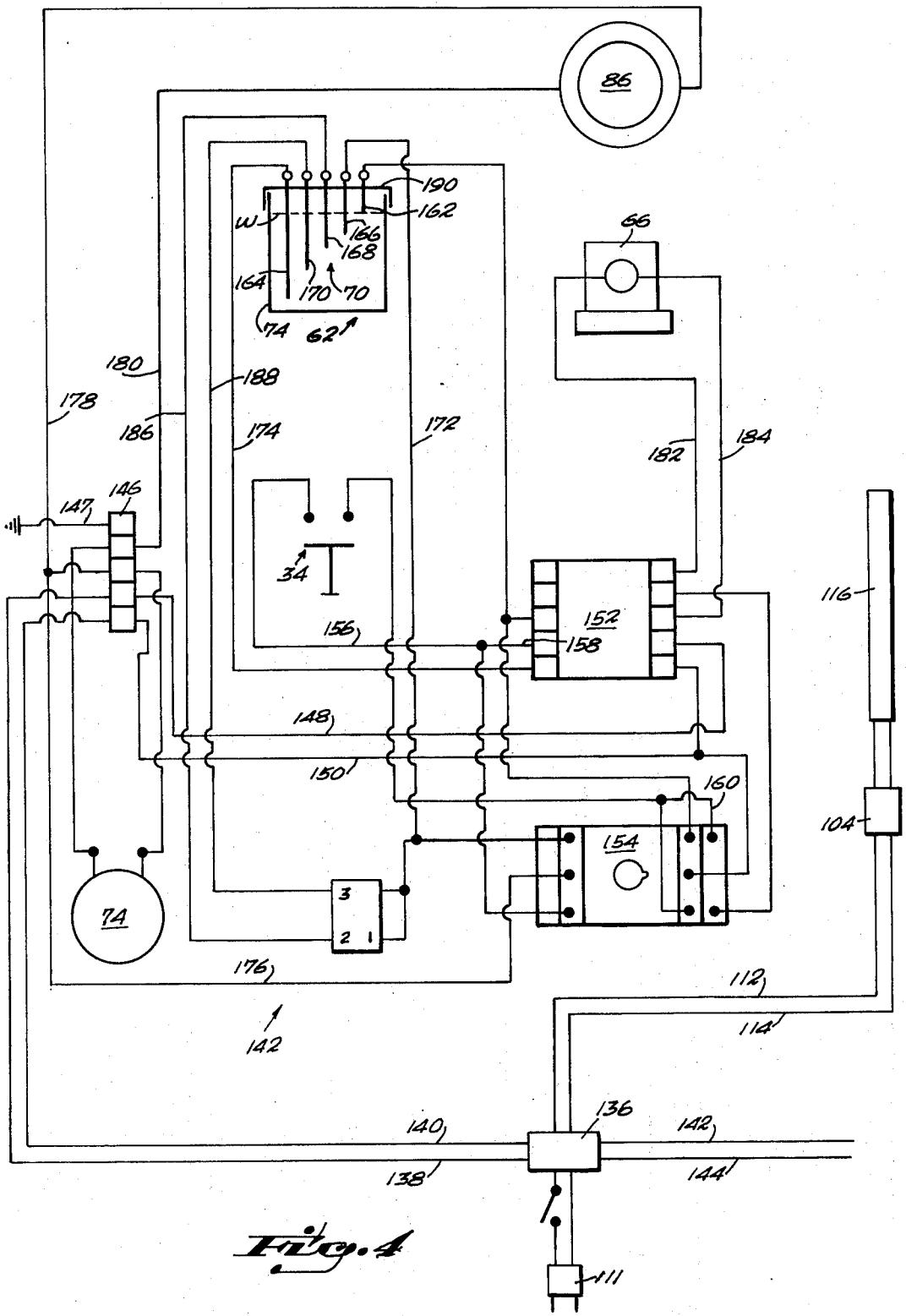
FIG. 4 is a general electrical schematic of the coffee making machine.

With reference to FIG. 4, the electric plug is connected to a junction box 136 by the leads 112 and 114, the main on-off switch 50 being in lead 112. From the junction box 136, the leads 112 and 114 continue to the bi-metal mercury switch and the immersion heater 116. Two pairs of leads 138, 140 and 142, 144 are provided from the junction box 136, as illustrated, for a two system machine. The leads 138 and 140 connect with the schematic electric diagram 142, as illustrated, and the leads 142 and 144 connect with a second system which is a duplication of the first system in all respects and is not shown.

From the junction box 136, the leads 138 and 140 connect to a junction block 146 which is grounded at 147 and leads 148 and 150 therefrom connect respectively with a conventional electronic control center regulator 152 and a relay 154. The push button switch 34, shown in FIG. 1, is provided in a lead 156 connecting between the regulator 152 at 158 and the relay 154 at 160.

The water doses 62 as previously described includes a vertical cylinder 74 containing five electrodes 70 of varying lengths. The shortest electrode 162 determines the maximum amount of water to be in the cylinder 74 and the longest or ground electrode 164 determines the minimum amount of water in the cylinder 74. The three intermediate length electrodes 166, 168 and 170 measure three independent water doses as determined by the three position selector switch 51 on the front panel 44.

When the selector switch 51 is moved to the "one" position and the push button switch is actuated, a circuit is completed through the lead 172 to the electrode 166, through the ground electrode 164, lead 174, through the regulator and relay 152 and 154 to the pump 74 through lead 176. Water from the cylinder 74 is delivered by the pump 74 under high pressure to the immersion tube 82 and a like volume of hot water is sent from the immersion tube 82 to the receptacle 38 containing the proper amount of ground coffee where it is percolated through strainers into the receiving cup.

When the water level W passes below the bottom tip of the electrode 166, the circuit is broken and the two-way solenoid valve 86, normally actuated by leads 178 and 180 with the pump 74, opens to relieve the system of all high pressures after the infusion has taken place. The one-way solenoid 66 is then energized through leads 182 and 184 to the regulator to replenish the water supply in the cylinder 74.

When the selector switch is moved to the two or three position, circuits are completed to the electrodes 168 or 170 by leads 186 or 188 to deliver charges of water to the brewing receptacle 38 in direct proportion to the depth of penetration by the respective electrodes in the same manner as above described relative to electrode 166.

The cylinder 74 is sealed with a cap 190 at the top and the five electrodes 162 through 170 are manually, slidably adjustable in friction bearings through the cap and the cylinder is preferably fabricated of a transparent material to provide visual observation of the depth of penetration of the various electrodes into the cylinder.

In operation, a three position selector switch 51 or 52 is set to the desired position for the proper water dose and a push button switch 34 or 36 is actuated to deliver the selected water dose to a brewing receptacle 38 or 40.

What is claimed is:

1. An expresso coffee machine comprising:
   A. a boiler including,
      1. heating means therein;
   B. a water supply conduit, from a source of supply, opening into said boiler, including,
      1. automatic control means to maintain a predetermined water level in said boiler;
   c. an immersion tube in said boiler, normally filled with hot water, connecting at its first end with said supply conduit by a second conduit;
   D. a coffee brewing receptacle, fixed relative to the front of the machine, normally provided with a predetermined amount of ground coffee, a third conduit connecting between a second end of said immersion tube and brewing receptacle;
   E. a water doser comprising,
      1. a cylinder in open communication with said second conduit,
      2. a plurality of electrodes extending into said cylinder to varying depths of penetration including,
         a. a long, ground electrode having the greatest depth of penetration,
         b. a short electrode having the least depth of penetration to determine the maximum amount of water received therein from said second conduit,
         c. at least two electrodes having variable, intermediate depths of penetration;
   F. a selector switch providing multiple positions for electric connections to the respective intermediate electrodes;
   G. an electric switch means for completing an electric circuit, as determined by the position of said selector switch, to energize an electric water pump to deliver a predetermined volume of water from said cylinder, through said second conduit to said first end of said immersion tube whereby a like volume of hot water is displaced through said third conduit to said coffee brewing receptacle, said volume of water being determined by the depth of penetration of the electrode through which the circuit is completed;
   H. electric valve means to automatically return the volume of water in said cylinder to its maximum depth.

2. An expresso coffee machine as defined in claim 1 wherein three electrodes, having variable, intermediate depths of penetration, are provided and said selector switch is provided with three positions.

3. An expresso coffee machine as defined in claim 2 including a cap in enclosing, sealing relation to the top of said tank and all of said electrodes are manually, slidably adjustable through said cap.

4. An expresso coffee machine as defined in claim 1 including an electric valve in said second conduit which is actuated by a main on-off electric switch to restore the water supply in said boiler to a predetermined level every time the machine is actuated, and a manually actuated valve in a by-pass conduit.

5. An expresso coffee machine as defined in claim 1 including filter strainers, and manually controlled on-off valves in said second and third conduits.

6. An expresso coffee machine as defined in claim 1 including a check valve in said second conduit between said tank and water pump.

7. An expresso coffee machine as defined in claim 1 wherein said water pump is of the high pressure type to deliver the charge of water to said coffee brewing receptacle under high pressure to create a forced percolation through said coffee brewing receptacle; a two-way solenoid valve is provided in said third conduit to relieve the system of all high pressure after the infusion.

* * * * *